United States Patent Office 3,181,932
Patented May 4, 1965

3,181,932
PROCESS FOR THE PRODUCTION
OF CYANAMIDE
Robert W. Foreman, Chagrin Falls, and Franklin Veatch, Lyndhurst, Ohio, assignors to The Standard Oil Company, Cleveland, Ohio, a corporation of Ohio
No Drawing. Filed Sept. 12, 1961, Ser. No. 137,524
14 Claims. (Cl. 23—190)

This invention relates to a process for the preparation of cyanamide by ammonolysis of a cyanogen halide, and more particularly to a process for the ammonolysis of cyanogen halide in a solvent facilitating separation of the cyanamide from the ammonium halide by-product.

It is possible to prepare melamine from hydrogen cyanide and ammonia stepwise by a combination of three processes, each the subject of applications for U.S. Letters Patent, and involving the following reactions:

(1)
$$HCN + NH_4Br \xrightarrow[\text{compartmented cell}]{\text{electrolysis in}} BrCN + NH_3\uparrow + H_2\uparrow$$

(2)
$$BrCN + 2NH_3 \xrightarrow[\text{solvent}]{\text{inert}} CNNH_2 + NH_4Br\downarrow$$

(3)
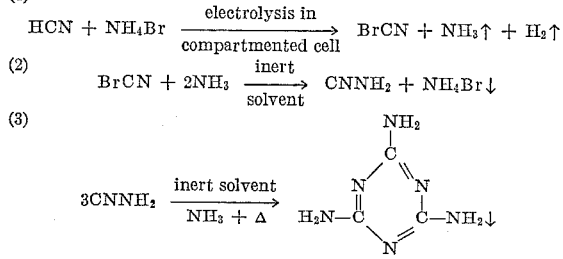

U.S. application Serial No. 95,479, filed March 14, 1961, now Patent No. 3,105,023, describes and claims the electrochemical reaction of hydrogen cyanide and ammonium halide to produce the cyanogen halide, and this cyanogen halide product can be reacted with ammonia to produce cyanamide in the process of the instant invention. The trimerization of cyanamide is described and claimed in Serial Number 162,875, filed December 28, 1961.

Cyanogen chloride and ammonia have been reacted heretofore in ethyl ether, and this reaction is described in the Encyclopedia of Chemical Technology, by Kirk and Othmer, vol. 4, page 671. However, reaction in this solvent does not give good yields of cyanamide uncontaminated by ammonium halide, and consequently, the process has not been adopted. Indeed, development has been directed toward non-solvent processes which avoid contamination problems of this type.

It has been determined in accordance with the invention that good yields of cyanamide are obtainable in a reaction conducted in a solvent if the solvent has a good solubility for cyanamide but a low solubility for ammonium halide. Ammonium halide in solution must be held to a minimum, to prevent side reactions involving ammonium halide, such as guanidine formation. The solvents which can be used in this ammonolysis are capable of dissolving at least 50 grams, and preferably 100 grams or more, of cyanamide per liter, and not in excess of about 5 grams, and preferably less than 1 gram, of ammonium halide per liter, and preferably have a boiling point between about 50 and 250° C. Solvents meeting these requirements are capable of giving yields of cyanamide in excess of 65%, and correspondingly good yields of ammonium halide in a good crystal form for reuse in the reaction with hydrogen cyanide. Ammonia must also, of course, be soluble in the solvent at the ammonolysis temperatures. The solvent must also be inert under the reaction conditons. It should not, for example, react with ammonia or with cyanogen halide. In the case where the reaction of cyanogen halide and ammonia is an intermediate step in the production of melamine, and the ammonium halide that is produced is recycled to the first reaction with hydrogen cyanide, certain special requirements to have to be met by the solvent, in order that the process will be practicable commercially. The ammonium halide that separates from the solvent should be in the form of crystals that are easily handled not only in recovering them from the cyanamide solution, but also for reuse in the reaction with hydrogen cyanide. The solvent should have a sufficiently low boiling point to be easily separated from ammonium halide crystals.

If the cyanamide is to be recovered, the solvent should also have a boiling point sufficiently removed from the boiling point of cyanamide to permit separation by distillation. If, on the other hand, the cyanamide solution is to be used directly in the third step of the reaction series to form melamine, it should have a low solubility for melamine, and it should be inert under the more drastic trimerization reaction conditions.

Solvents meeting these requirements are selected from the group consisting of cyclic ethers; polyoxyalkylene ethers; sulfones, and especially the sulfolanes, five-membered ring compounds containing the group

in the ring, and having from four to twelve carbon atoms, esters of aliphatic fatty acids and aliphatic alcohols having from three to about ten carbon atoms; and aliphatic nitriles having from two to about ten carbon atoms.

There is no criticality in molecular weight, except that the solvent should, of course, be a liquid preferably at room temperature and certainly at reaction temperature, and should have a sufficiently low boiling point to permit its separation from the dicyandiamide or melamine at the conclusion of the process.

Polyoxyalkylene and cyclic ethers best meet the above requirements, and of these, dimethoxyethane (dimethyl ethylene glycol) and 1,4-dioxane are preferred. Dimethyltriethylene glycol, dibutoxy diethylene glycol, dimethyl diethylene glycol, dibutyl triethylene glycol, dimethyl tetraethylene glycol and diethyl diethylene glycol are additional exemplary polyoxyalkylene ethers. The polyoxyalkylene ethers have at least two ether groups linked by an alkylene group and terminal alkyl groups are attached to the first and last ether groups in the chain. The ether should not have an appreciable hydrocarbon character, and it is therefore important that there be a large proportion of ether groups to carbon atoms, preferably at least one ether oxygen for each five carbon atoms.

The cyclic ethers are ring compounds having the ether oxygen in the ring, which is composed of oxygen and carbon atoms. The ring will contain at least one and preferably two ether oxygens, and at least one ether oxygen for each five carbon atoms. Tetrahydrofuran, 1,3-dioxane, and tetrahydropyran are additional examples of cyclic ethers.

The sulfolanes are ring compounds having the general structure:

The first member of the series is sulfolane, thiophan sulfone. Additional examples are dimethyl sulfolane, methyl sulfolane, and dibutyl sulfolane.

The organic esters of fatty acids and aliphatic alcohols include ethyl acetate, ethyl butyrate, isopropyl butyrate, ethyl caproate, methyl 2-ethyl hexoate, isobutyl butyrate, ethyl propionate, isopropyl valerate and 2-ethyl hexyl acetate.

Acetonitrile, propionitrile, isobutyronitrile, and butyronitrile are exemplary nitriles.

The process is applicable to any cyanogen halide. When a step in the production of melamine, any halide can be used, since it is continuously recovered and recycled. Cyanogen bromide is preferred, because it is easier to work with in the initial electrolysis step. Cyanogen fluoride, cyanogen chloride and cyanogen iodide can also be employed.

It is important that the reaction mixture contain a slight excess of ammonia, inorder to obtain complete reaction of the cyanogen halide. Hence, the ammonia-to-cyanogen halide ratio should be at least 2. Ratios in excess of about 2.25 lead to undesirably large amounts of residual halide in the solution, and accordingly, the preferred range of ratios is from about 2 to 2.25.

The reaction is exothermic. The amount of heat to be removed is rather large, approximately 56 kcal. per mol. Therefore, it may be desirable to cool the reactants to a very low temperature initially; the reaction will start at temperatures as low as −40° C. The optimum yields are obtained at reaction temperatures of from 0° C. to about 10° C., but temperatures as high as 80° C. to 100° C. can be used advantageously under pressure to maintain the cyanogen halide in the liquid phase. Because the reaction is exothermic, it is rather rapid, and is complete in from 15 minutes to a few hours' time. The reaction proceeds very rapidly at room temperature, and is complete in about 30 minutes.

The lower the reaction temperature, the more compact the deposit of ammonium bromide crystals that is obtained, and this type of deposit is advantageous because of easy filtration. At temperatures above or near the boiling point of the cyanogen halide used, about 60° C. in the case of cyanogen bromide, a large amount of the halide will appear in the vapor phase above the reaction mixture, and this may be undesirable because of the loss of cyanogen halide in undesired side reactions. This problem can be avoided by application of superatmospheric pressures at such temperatures. If cyanamide is the desired end product, the reaction temperature should not be permitted to exceed 100° C., because of the possibility of forming guanidine and/or guanamine and/or melamine.

The concentration of the reactants in the reaction solution can be widely varied. Good yields of cyanamide are obtainable at concentrations of cyanogen halide as low as about 0.01%. The maximum concentration is imposed only by the solubility of cyanogen halide in the solvent, i.e., up to a saturated solution, and it is also possible to disperse in the reaction mixture more cyanogen halide than can be dissolved therein initially, inasmuch as the cyanogen halide will dissolve as it is consumed in the reaction. The cyanogen halide concentration has no apparent effect upon the yield of cyanamide or ammonium halide.

The solvent employed should be substantially anhydrous, for optimum yields. Ammonium halide is extremely soluble in water, and the presence of water can therefore lead to losses of this product, thus increasing the cost of operation. However, the reaction will proceed in the presence of water, and rather large amounts can frequently be tolerated, up to about 10% by weight of the solution.

It is usually preferable in carrying out the reaction to dissolve the cyanogen halide in the solvent, bring the solution to the reaction temperature and then admit ammonia gas or liquid ammonia at a rate sufficient to permit control of the reaction temperature within the desired range. The reaction system should be provided with a means for carrying off the heat liberated, such as refluxing beneath a condenser, or by cooling coils inserted within the reaction vessel, or by a cooling jacket enclosing the reaction vessel. The refluxing temperature can be lowered if the solvent has a higher boiling point than the desired reaction temperature, by including a small amount of a compatible inert lower boiling liquid, such as isopentane, pentane and dimethyl ether. As the reaction proceeds, ammonium halide will separate out, and it will be desirable to agitate the system to maintain uniformity. After reaction is completed, usually in from 15 minutes to about 5 hours, the precipitated ammonium halide is removed, such as by filtration, decantation, or centrifugation. If cyanamide is to be recovered, the reaction solvent is then separated by vacuum or atmospheric pressure distillation at a temperature below that at which the cyanamide will be dimerized to dicyandiamide, trimerized to melamine, or otherwise decomposed or polymerized.

The crude cyanamide solution that is recovered at the conclusion of the reaction contains principally cyanamide with small amounts of dicyandiamide and triazines such as ammeline and ammelide. At the higher reaction temperatures, a larger proportion of dicyandiamide and triazines are obtained. The cyanamide can be freed from such impurities by cautious distillation or by recrystallization from a solvent for cyanamide that is a nonsolvent for the higher polymers of cyanamide, such as a mixture of diethyl ether and benzene, or chloroform or carbon disulfide.

In the commercial process for making melamine, wherein the cyanogen halide is obtained by the electrochemical reaction of hydrogen cyanide and ammonium halide in an electrolytic cell, such as is described in application Serial No. 95,479 cyanogen halide fed from the cell anolyte stripping still is dissolved in the solvent employed in the process of this invention, and then subjected to ammonolysis as described above. The slurry that is obtained is pumped to settlers after the ammonia addition to complete both the reaction and crystallization of ammonium halide. The slurry is then pumped to centrifuges, where the ammonium halide is separated, washed and dried, and recycled to the reaction with hydrogen cyanide. The solvent containing cyanamide is then pumped into an autoclave, which is pressured with ammonia and brought to reaction temperature for trimerization to melamine.

The following examples, in the opinion of the inventors, represent preferred embodiments of the invention.

EXAMPLES 1 TO 4

In a 500 ml. 3-necked round-bottom flask equipped with an inlet tube, stirrer with a Teflon paddle, thermometer and outlet tube connected through a bubble device, was placed 100 cc. of a solution of cyanogen bromide in the solvent listed in Table I below. This solution contained 20 to 30 grams of cyanogen bromide, as noted in the table. The vessel was tared, placed in a bath of Dry Ice and alcohol, and ammonia gas then admitted into the vapor phase above the reaction mixture at a slow enough rate so that all of it was absorbed by the reaction mixture, as evidenced by the absence of any gas escaping through the bubble device. The reaction temperature was kept within the range given in the table by the addition of Dry Ice to the cooling bath as required. Periodically, the addition of ammonia was discontinued and the assembly weighed, to observe the proportion of ammonia to cyanogen bromide. After enough ammonia had been absorbed, corresponding to 2.2 mols of ammonia per mol. of cyanogen bromide, addition of ammonia was halted, and the reaction mixture was allowed to stand for one hour, during which time the ammonium bromide formed a deposit at the bottom of the vessel, and the reaction was completed.

The reaction mixture was filtered under vacuum, and the filter cake washed with three 20 ml. portions of solvent. The filtrate and washes were combined. If the filter cake was gummy or highly colored, it was further washed with tetrahydrofuran. The solid ammonium bromide was then air-dried and weighed. Spot checks of the ammonium bromide by infrared analysis showed the crystals to be spectroscopically pure.

The cyanamide solutions were analyzed for residual halide, by silver titration to the disappearance of ferric thiocyanate color. The cyanamide was determined by silver salt precipitation or by the colorimetric method of Buyske and Downing Analytical Chemistry, 32, 1798 (1960).

The yields of ammonium bromide and cyanamide, and the concentration of residual halide, are given in Table I.

Table I

| Example No. | Solvent of the invention | BrCN concentration (w/v percent) | Temperature (° C.) | Concentration of residual halide (m./l.) | Yields CNNH$_2$ (percent) | Yields NH$_4$Br (percent) |
|---|---|---|---|---|---|---|
| 1 | Acetonitrile | 30 | 22-49 | 0.009 | 80 | 95 |
| 2 | Dioxane | 26.5 | 42-49 | 0.048 | 82 | 98 |
| 3 | Dimethyl sulfolane | 21.2 | 21-32 | 0.031 | 88 | [1] 97 |
| 4 | Dimethyl diethylene glycol. | 20 | 20-35 | 0.155 | 78 | 102 |

[1] The solid was washed with tetrahydrofuran to remove most of the adhering oils.

The foregoing data show that yields in excess of 78% cyanamide and 95% ammonium bromide are obtainable using these solvents, and that the concentration of residual halide is quite low.

The above results are to be contrasted with the results obtained using the following organic solvents, which were employed under exactly the same reaction conditions, using the same reaction equipment:

Table II

| Solvent | BrCN concentration (w/v percent) | Temperature (° C.) | Concentration of residual halide (m./l.) | Yields CNNH$_2$ (percent) | Yields NH$_4$Br (percent) |
|---|---|---|---|---|---|
| Butanol | 21.2 | 32-45 | 0.172 | 50 | 88 |
| 4-methyl-2-pentanol | 21.2 | 24-38 | 0.009 | 45 | 95 |
| Methanol | 21.2 | 22-35 | 1.074 | 49 | 31 |
| Water | 9.9 | 22-30 | 0.759 | 8 | 0 |
| Diethyl ether | 21.2 | 17-25 | | 10 | [1] 106 |

[1] The solid was washed with tetrahydrofuran to remove most of the adhering oils.

Diethyl ether, it will be noted, is really no better than water as a solvent as regards the yield of cyanamide. The alcohols are better, but the yields of cyanamide are quite unsatisfactory as compared to the solvents of the invention.

EXAMPLES 5 TO 7

A series of reactions was carried out at reaction temperatures ranging from 0° C. to 50° C. using dioxane as the solvent and cyanogen bromide as the reactant, and following the reaction procedure with the same equipment of Examples 1 to 4. The following results were obtained:

Table III

| Example No. | Temperature (° C.) | Ammonia addition rate (mmol. NH$_3$/min./m. BrCN) | Concentration of residual halide (m./l.) | Yields CNNH$_2$ (percent) | Yields NH$_4$Br (percent) |
|---|---|---|---|---|---|
| 5 | 0-5 | 55 | 0.043 | 71 | 97 |
| 6 | 26-30 | 52 | 0.045 | 83 | 94 |
| 7 | 44-50 | 60 | 0.045 | 76 | 91 |

It is apparent from the above data that the reaction temperature is not critical, and that good yields are obtainable over a wide range.

EXAMPLES 8 TO 14

In a 500 ml. 3-necked, round-bottom flask equipped with a thermometer, stirrer with a Teflon paddle, cold finger reflux condenser using a mixture of Dry Ice and acetone as the coolant, and a gas entry port, was placed 30 cc. of the low boiling liquid noted in Table IV together with 3 times its volume of cyanogen bromide in solution in a solvent of the invention, as noted in Table IV. The total volume of solution in the vessel was 120 cc., and the concentration of cyanogen bromide therein is given in the table. A weighed amount of ammonia was added to the vessel space from which it could enter the reaction mixture from either vapor or reflux. The reaction mixture was stirred at the reflux temperature for 30 minutes and then stored at room temperature for one hour. The reaction mixture was then filtered under vacuum, and the filter cake washed with three 25 cc. portions of the solvent mixture. The filtrate and washes were combined, and analyzed for residual halide and cyanamide content, using the procedures set forth in Examples 1 to 4. If the filter cake was gummy or highly colored, it was washed with tetrahydrofuran, and the cake was then air-dried and weighed as ammonium bromide. Infrared inspection of several samples showed the ammonium bromide to be spectroscopically pure.

The following were the results obtained:

Table IV

| Example No. | Solvent of the invention | Low boiling liquid | BrCN Concentration (w/v percent) | Temperature (° C.) | Concentration of residual halide (m./l.) | Yields CNNH$_2$ (percent) | Yields NH$_4$Br (percent) |
|---|---|---|---|---|---|---|---|
| 8 | Tetrahydrofuran | Dimethyl ether | 24 | 5-10 | 0.024 | 65 | 89 |
| 9 | Dimethoxyethane | do | 25 | 10-15 | 0.004 | 69 | 96 |
| 10 | Dimethyl diethylene glycol | do | 25 | -1-17 | 0.091 | 65 | 92 |
| 11 | Sulfolane | Isopentane | 25 | 30-40 | 0.010 | 74 | [1] 90 |
| 12 | Dimethyl triethylene glycol | do | 25 | 30-40 | 0.184 | 69 | 88 |
| 13 | Dimethyl formamide | do | 25 | 30-40 | 0.951 | 71 | 52 |
| 14 | Ethyl acetate | do | 25 | 30-40 | 0.008 | 68 | 102 |

[1] The solid was washed with tetrahydrofuran to remove most of the adhering oils.

The data show that good yields are obtainable by this method also, although the yields are not quite as high as in the case of Examples 1 to 4.

A series of reactions was carried out for purposes of comparison using other solvents, in the same equipment and under the same conditions. The following results were obtained:

*Table V*

| Solvent of the invention | Low boiling liquid | BrCN concentration (w/v percent) | Temperature (° C.) | Concentration of residual halide (m./l.) | Yields | |
|---|---|---|---|---|---|---|
| | | | | | $CNNH_2$ (percent) | $NH_4Br$ (percent) |
| Butanol | Isopentane | 25 | 30–40 | 0.078 | 0 | 87 |
| Nitromethane | ___do___ | 25 | 30–40 | | 0 | 77 |
| 3-pentanone | ___do___ | 25 | 30–40 | 0 | 0 | [1] 77 |

[1] The solid was washed with tetrahydrofuran to remove most of the adhering oils.

These solvents are clearly unsatisfactory.

EXAMPLES 15 TO 17

A series of reactions was carried out at various reaction temperatures using dioxane as the solvent of the invention, and the procedure of Examples 8 to 14. The low boiling liquid was either dimethyl ether or isopentane, as noted in Table VI.

*Table VI*

| Example No. | Low boiling liquid | Temperature (° C.) | Ammonia addition rate (mmol. $NH_3$/min./m. BrCN) | Yields | | Concentration of residual halide (m./l.) |
|---|---|---|---|---|---|---|
| | | | | $CNNH_2$ (percent) | $NH_4Br$ (percent) | |
| 15 | Dimethyl ether | 2 | 420 | 69 | 95 | 0.011 |
| 16 | Isopentane | 35–40 | 420 | 81 | 92 | 0.011 |
| 17 | Diethyl ether | 50–55 | 700 | 78 | 92 | 0.082 |

The results show that good yields are obtainable over a wide range of temperatures, with the optimum temperatures ranging from 35 to 40° C. The ammonium bromide recovered was in the form of crystals, readily separated from the reaction mixture and easily dried for reaction with hydrogen cyanide.

EXAMPLES 18 TO 20

A series of reactions was carried out at varying cyanogen bromide concentrations, following the procedure of Examples 5 to 7, using dioxane as the solvent and ammonolysis temperatures of 32 to 50° F. in each run, and a ratio of ammonia to cyanogen bromide of from 2 to 2.3. The following data were obtained:

*Table VII*

| CNBr (w/v percent) | Yield $NH_4Br$ (percent) |
|---|---|
| 20 | 97 |
| 30 | 98 |
| 50 | 97 |

It is apparent that the concentration of cyanogen bromide has no effect upon the yield of ammonium bromide obtained.

EXAMPLES 21 TO 23

A series of reactions was carried out exactly as set forth in Examples 5 to 7, substituting cyanogen chloride for the cyanogen bromide. The yields of cyanamide obtained ranged from 70–85% and the yields of ammonium chloride from 95–98%. The concentration of residual halide in each run was approximately 0.04 mole per liter.

We claim:

1. The process for the production of cyanamide from cyanogen halide and ammonia, which comprises reacting the cyanogen halide with ammonia at a temperature at which the reaction proceeds within the range from about −40° C. up to about 100° C., in solution in an inert solvent for cyanogen halide and cyanamide, in which cyanamide is soluble in an amount of at least 50 grams per liter and ammonium halide is soluble in an amount not in excess of about 5 grams per liter at the reaction temperature, and selected from the group consisting of cyclic ethers having an ether oxygen in the ring and at least one ether oxygen for each five carbon atoms, polyoxyalkylene ethers having at least one ether oxygen for each five carbon atoms, sulfones having from four to twelve carbon atoms, esters of aliphatic fatty acids and aliphatic alcohols having from three to about ten carbon atoms, and aliphatic nitriles having from two to about ten carbon atoms.

2. A process in accordance with claim 1 in which the cyanogen halide is cyanogen bromide.

3. A process in accordance with claim 1 in which the cyanogen halide is cyanogen chloride.

4. A process in accordance with claim 1 in which the ammonia is in an amount within the range from about 2 to about 2.25 mols per mol of cyanogen halide.

5. A process in accordance with claim 1 in which the inert solvent is an aliphatic ester having from three to ten carbon atoms.

6. A process in accordance with claim 5 in which the ester is ethyl acetate.

7. A process in accordance with claim 1 in which the inert solvent is a sulfolane having from four to twelve carbon atoms.

8. A process in accordance with claim 1 in which the inert solvent is an aliphatic nitrile having from two to ten carbon atoms, 9. A process in accordance with claim 8 in which the nitrile is acetonitrile.

10. A process in accordance with claim 1 in which the inert solvent is a polyoxyalkylene ether having at least one ether oxygen for each five carbon atoms.

11. A process in accordance with claim 10 in which the polyoxyalkylene ether is dimethoxyethane.

12. A process in accordance with claim 1 in which the inert solvent is a cyclic ether having an ether oxygen in the ring and at least one ether oxygen for each five carbon atoms.

13. A process in accordance with claim 12 in which the cyclic ether is dioxane.

14. A process in accordance with claim 12 in which the cyclic ether is tetrahydrofuran.

References Cited by the Examiner

FOREIGN PATENTS 636,600    5/60    Great Britain.

OTHER REFERENCES

Williams: "Cyanogen Compounds," Edward Arnold & Co., London, 2nd ed., 1948 page 7.

MAURICE A. BRINDISI, *Primary Examiner*.